(12) United States Patent
Chou et al.

(10) Patent No.: US 7,091,704 B2
(45) Date of Patent: Aug. 15, 2006

(54) THREE-PHASE THREE-WIRE ACTIVE POWER FILTER

(75) Inventors: Hung-Liang Chou, Kaohsiung (TW);
Chin-Chang Wu, Kaohsiung (TW);
Wen-Pin Hsu, Kaohsiung (TW);
Ya-Tsung Feng, Kaohsiung (TW);
Yao-Jen Chang, Kaohsiung (TW)

(73) Assignee: UIS Abler Electronics Co., Ltd., Taipei Hsien (TW)

( * ) Notice: Subject to any disclaimer, the term of this patent is extended or adjusted under 35 U.S.C. 154(b) by 0 days.

(21) Appl. No.: 11/153,533

(22) Filed: Jun. 16, 2005

(65) Prior Publication Data

US 2006/0033479 A1 Feb. 16, 2006

(30) Foreign Application Priority Data

Aug. 11, 2004 (TW) .............................. 93124023 A

(51) Int. Cl.
*G05F 1/70* (2006.01)
*H02J 1/02* (2006.01)

(52) U.S. Cl. .................. 323/207; 363/40; 307/105
(58) Field of Classification Search ................. 363/40; 307/105; 323/207, 208

See application file for complete search history.

(56) References Cited

U.S. PATENT DOCUMENTS

| 5,321,598 | A | | 6/1994 | Moran |
| 5,465,203 | A | * | 11/1995 | Bhattacharya et al. ........ 363/40 |
| 5,567,994 | A | | 10/1996 | Davis et al. |
| 5,731,965 | A | | 3/1998 | Cheng et al. |
| 5,977,660 | A | | 11/1999 | Mandalakas et al. |
| 6,472,775 | B1 | | 10/2002 | Huang et al. |
| 6,717,465 | B1 | | 4/2004 | Chou et al. |

* cited by examiner

*Primary Examiner*—Shawn Riley
(74) *Attorney, Agent, or Firm*—Bacon & Thomas

(57) ABSTRACT

A three-phase three-wire active power filter includes a dc power capacitor, a power converter, a filter inductor set, a reactive power compensating capacitor set, a combined capacitor/resistor filtering set and a control circuit. The dc power capacitor provides with a regulated voltage. The power converter includes a two-arm bridge power converter, and has a pair of ac terminals and a pair of dc terminals. A phase of the three-phase three-wire active power filter, without control of the power electronic switch set, directly connects with any one of the dc terminals. Consequently, the number of power electronic switches employed in the two-arm bridge power converter of the three-phase three-wire active power filter can be reduced.

6 Claims, 4 Drawing Sheets

THREE-PHASE THREE-WIRE ACTIVE POWER FILTER

BACKGROUND OF THE INVENTION

1. Field of the Invention

The present invention relates to a three-phase, three-wire active power filter. More particularly, the present invention relates to the active power filter applied to a three-phase, three-wire power system for filtering harmonic currents generated therein.

2. Description of the Related Art

The power electronic devices with high-voltage rated, high-current rated, and high switching speed characteristics have been developed due to the improvement of semiconductor manufacturing technique, recently. Power electronic devices are applied in electric power facilities, such as switching power supply, uninterruptible power supply, motor driver, arc furnace, trolley car, battery charger, and lighting appliance etc. The electric power facilities may generate a large amount of harmonic current due to the nonlinear input characteristic of such loads. The harmonic current will pollute the power system and result in the problems such as transformer overheat, rotary machine vibration, degrading voltage quality, electric power components destruction, medical facilities malfunction etc.

In order to improve the problems of harmonic pollution effectively, many harmonic control standards, such as IEEE519-1992, IEC 61000-3-5, and IEC 61000-3-4 etc., have been established by international research institute. In Taiwan, there is also established a power control provisional standard for harmonic by Taiwan Power Company. Therefore, how to solve the harmonic problems is an important topic in today's power system worldwide.

Conventionally, the passive power filter is used to solve the problems of harmonic. The passive power filter generally consists of inductors and ac capacitors. However, the passive power filter causes the problems of resonance and neighboring harmonic current injection that may damage the passive power filter. Additionally, it is quite hard to obtain a better filtering effect of the passive power filter due to system reactance that may easily affect the filtering characteristic of the passive power filter.

Many other solutions employing an active power filter for solving the harmonic problem are disclosed in the well-known art, such as U.S. Pat. Nos. 6,472,775, 5,977,660 and 5,321,598.

Referring initially to FIG. 1, a schematic circuitry of a conventional active power filter is illustrated. In the illustrated circuitry, a power source 1 supplies three-phase electric power to a load 3 with which to parallel-connect an active power filter 4. The active power filter 4 includes a dc capacitor 40, a power converter 41 and a switching ripple filter 42. The power converter 41 is employed to switch a voltage of the dc capacitor 40 that creates three-phase compensating currents via the switching ripple filter 42 to be injected into a power line. The power converter 41 is a power electronic switch set having a three-arm bridge structure. The switching ripple filter 42 is selected from an inductor or a combination of an inductor and a capacity which is used to filter high-frequency ripple currents due to switching power electronic switches of the power converter 41. Although the active power filter 4 performs a better filtering characteristic, the capacity of the power converter 41 of the active power filter 4 must be greater than the product of the harmonic current of the load 3 and the voltage of the power source 1. Therefore, the capacity and manufacture cost of the power converter 41 of the active power filter 4 must be significantly increased so that applications of the active power filter 4 are disadvantageously limited.

A hybrid power filter consisting of a passive power filter and a power converter is developed to overcome the high-capacity and high-price problems caused by the power converter of the active power filter because the passive power filter is used to lower the capacity of the power converter. For example, the hybrid power filter is disclosed in U.S. Pat. Nos. 5,567,994, 5,731,965 and 6,717,465. However, these hybrid power filters have been applied to a three-phase, three-wire power system which constantly employs a power electronic switch set having a three-arm bridge structure. In the three-arm bridge structure, at least six power electronic switches must be given if each arm is configured a pair of power electronic switches.

However, there is a need for reducing the number of the power electronic switches for the power converter that may reduce manufacture cost of the hybrid power filter for increasing its market competitiveness.

The present invention intends to provide a three-phase, three-wire active power filter including a reactive power compensating capacitor and a power converter. The power converter only employs a power electronic switch set with a two-arm bridge structure and permits one of power lines of a three-phase, three-wire power system to be connected to either a positive or negative dc terminal of the power electronic switch set without passing through a power electronic switch. Consequently, the number of the power electronic switches employed in the three-phase, three-wire active power filter can be reduced.

SUMMARY OF THE INVENTION

The primary objective of this invention is to provide a three-phase three-wire active power filter including a dc power capacitor, a power converter, a filter inductor set, a reactive power compensating capacitor set and a combined capacitor/resistor filtering set. The dc power capacitor provides with a regulated voltage. The power converter includes a two-arm bridge power converter, and has a pair of ac terminals and a pair of dc terminals. The dc terminals of the power converter electrically connect to the positive and negative terminals of the dc power capacitor. Three inductors of the filter inductor set correspondingly connect in series with three ac power capacitors of the reactive power compensating capacitor set for compensating reactive power, and wherein two serial-connected inductor ac power capacitor sets connect to two points between two power lines of a three-phase three-wire power system and the two ac terminals of the power converter. The other serial-connected inductor/capacitor set connects with a point between the other power line of the three-phase three-wire power system and one of the two dc terminals of the power converter. Consequently, the number of power electronic switches employed in the bridge power converter of the three-phase three-wire active power filter can be reduced.

Further scope of the applicability of the present invention will become apparent from the detailed description given hereinafter. However, it should be understood that the detailed description and specific examples, while indicating preferred embodiments of the invention, are given by way of illustration only, since various will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 2:
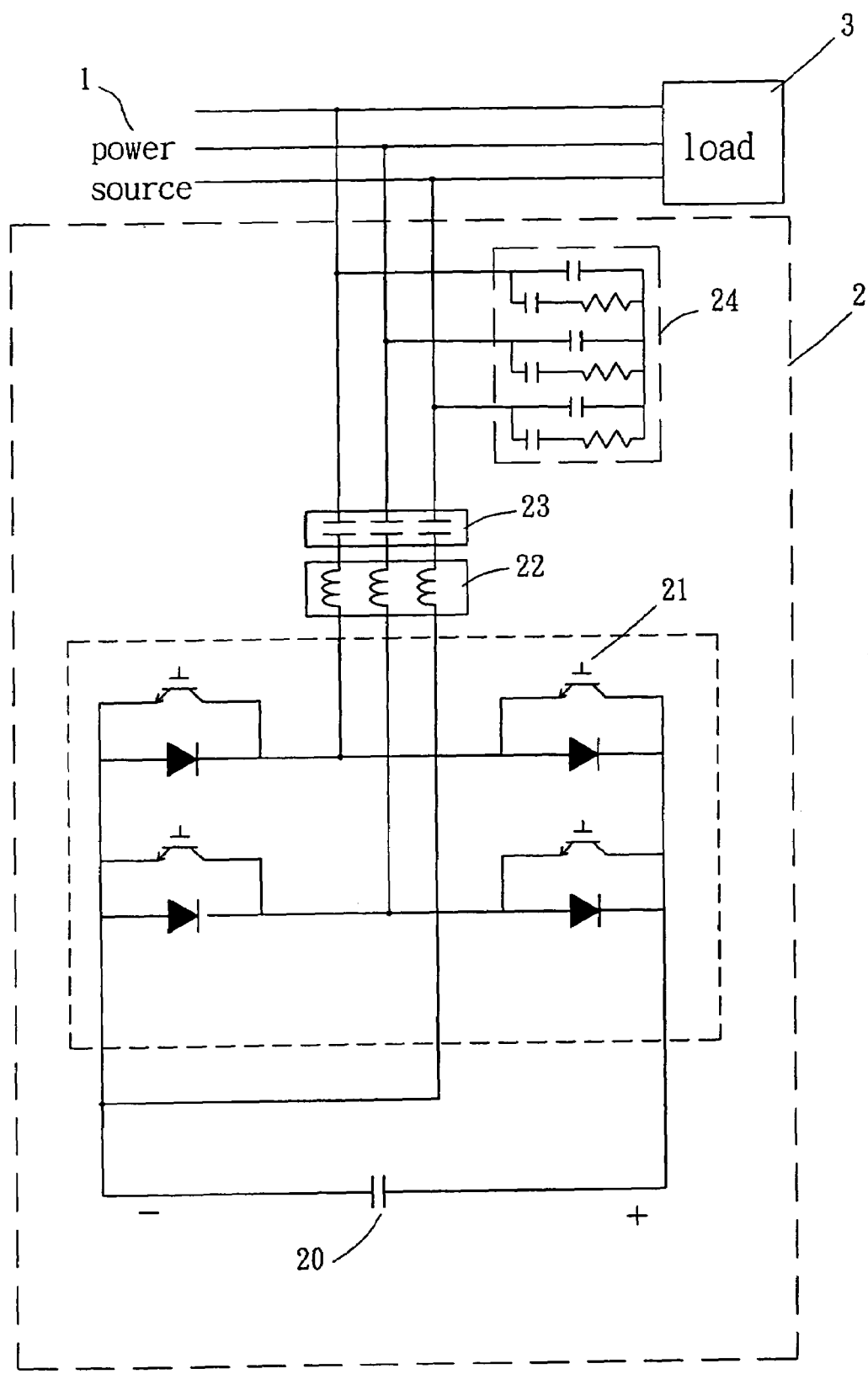
FIG. 2 is a schematic circuitry of a three-phase three-wire active power filter in accordance with a first embodiment of the present invention.

Referring to FIG. 2, a schematic circuitry of a three-phase three-wire active power filter in accordance with a first embodiment of the present invention is illustrated. The three-phase three-wire active power filter 2 includes a dc power capacitor 20, a power converter 21, a filter inductor set 22, a reactive power compensating capacitor set 23 and a combined capacitor/resistor filtering set 24. A power source 1 supplies three-phase three-wire power to a load 3 through three power lines.

The power source 1 provides with three-phase three-wire power for the load 3. The three-phase three-wire active power filter 2 connects the load 3 in parallel for filtering harmonic currents generated from the load 3 and supplying a fundamental reactive power current. The dc power capacitor 20 is used to provide a regulated dc voltage. The power converter 21 includes a two-arm bridge power converter, and each arm of the power electronic switch set comprises a pair of power electronic switches. Each of the power electronic switches consists of a power transistor or an IGBT and a diode. In addition, the two-arm bridge power converter has a pair of ac terminals and a pair of dc terminals. Each connection point of each arm connected between the two power electronic switches is regarded as an ac terminal of the two-arm bridge power converter. Correspondingly, two points of the dc side of the two-arm bridge power converter are regarded as two dc terminals. The dc terminals of the power converter 1 electrically connect with the dc power capacitor 20. The filter inductor set 22 and the reactive power compensating capacitor set 23 contain three inductors and three ac power capacitors respectively. Three inductors of the filter inductor set 22 correspondingly connect in series with three ac power capacitors of the reactive power compensating capacitor set 23 for filtering ripple current generated from switching operation of power converter 21 and for compensating a reactive power. Two serial-connected inductor/ac power capacitor sets connect with two points located between any two of three power lines of a three-phase three-wire power system 1 and the two ac terminals of the power converter 21. In the first embodiment, the other serial-connected inductor/ac power capacitor set connects with a point located between the other power line of the three-phase three-wire power system 1 and a negative terminal of the dc terminals of the power converter 21. The combined capacitor/resistor filtering set 24 connects in parallel with the three power lines of the three-phase three-wire power system 1 for further filtering ripple currents due to switching the power converter 21.

Still referring to FIG. 2, each phase of the three-phase three-wire active power filter 2 includes one ac power capacitor of the reactive power compensating capacitor set 23 which can effectively block a dc voltage generated from the power converter 21. Consequently, the power converter 21 with two arms of the power electronic switches can be used for controlling two compensation currents when the power converter 21 is applied to the three-phase three-wire power system 1. Generally, the summation of the three-phase currents in the three-phase three-wire power system 1 is zero. Hence, the third phase of the three-phase three-wire active power filter 2 connecting with no power electronic switches can provide with a third-phase compensation current if the other two compensation currents connecting to two ac terminals of the two-arm bridge power converter 21 are controlled to provide with correct compensation currents. Advantageously, the three-phase compensation currents of the three-phase three-wire active power filter 2 are injected into the three power lines of the three-phase, three-wire power system 1. After compensating by this active power filter, the three-phase currents supplied from the three-phase three-wire power system 1 can be nearly sinusoidal.

Figure 3:
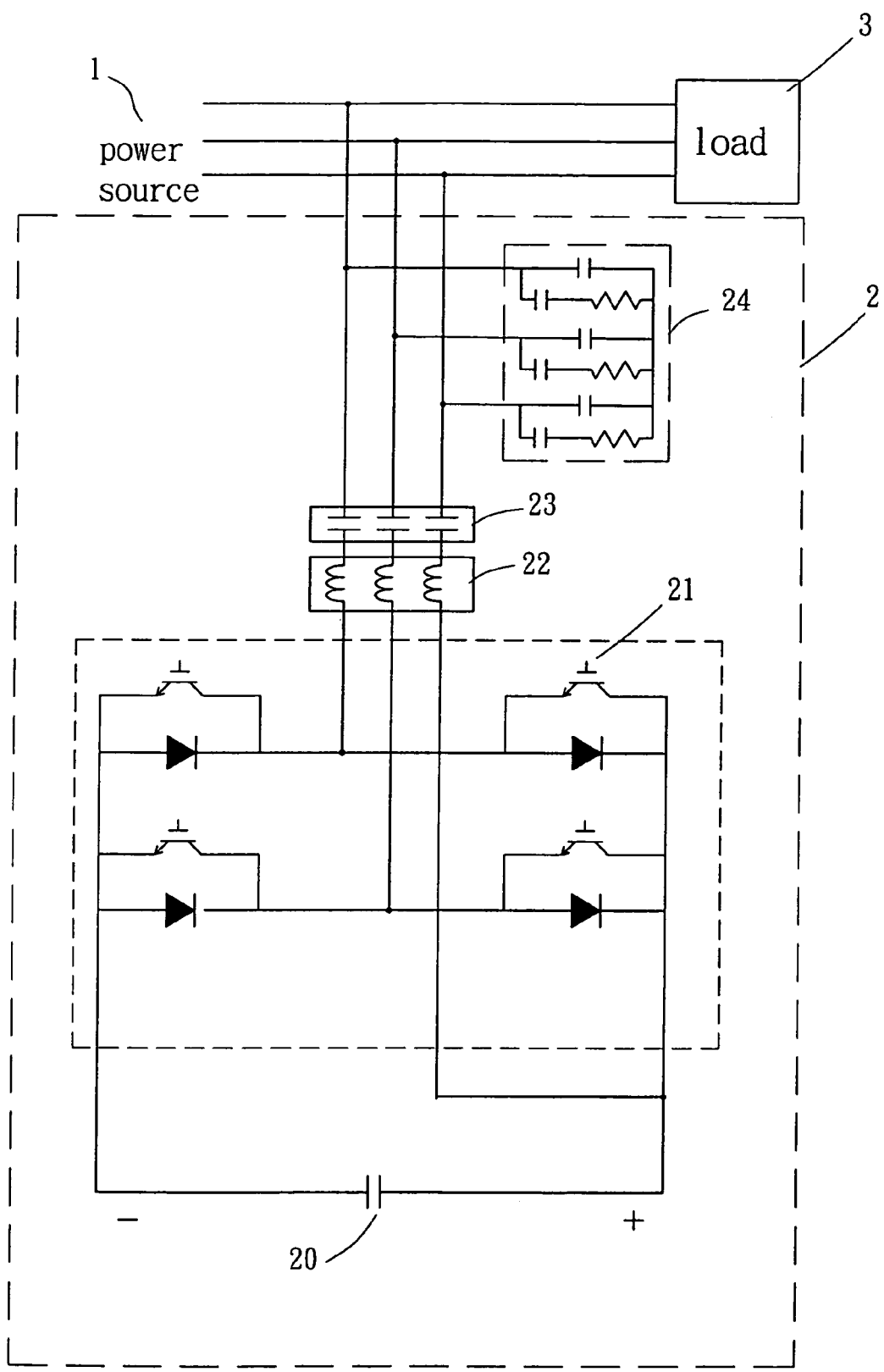
FIG. 3 is a schematic, circuitry of a three-phase three-wire active power filter in accordance with a second embodiment of the present invention.

Turning now to FIG. 3, a schematic circuitry of a three-phase three-wire active power filter in accordance with a second embodiment of the present invention is illustrated. Reference numerals of the second embodiment of the present invention have applied the identical numerals of the first embodiment, as shown in FIG. 2. The circuitry of the three-phase three-wire active power filter in accordance with the second embodiment of the present invention has similar configuration and same function as that of the first embodiment and detailed descriptions may be omitted.

Referring to FIG. 3, in comparison with the first embodiment, the three-phase three-wire active power filter 2 of the second embodiment has an alternative connection for the combination of the filter inductor set 22 with the reactive power compensating capacitor set 23. However, the ac power capacitor of the reactive power compensating capacitor set 23 can effectively block either of a positive value or a negative value of the dc voltage generated form the power converter 21. Similarly, two serial-connected inductor/capacitor sets connect with two points located between any two of three power lines of a three-phase three-wire power system 1 and the two ac terminals of the power converter 21. In the second embodiment, the other serial-connected inductor/capacitor set alternatively connects with a point located between the other power line of the three-phase three-wire power system 1 and a positive terminal of the dc terminals of the power converter 21.

Figure 1:
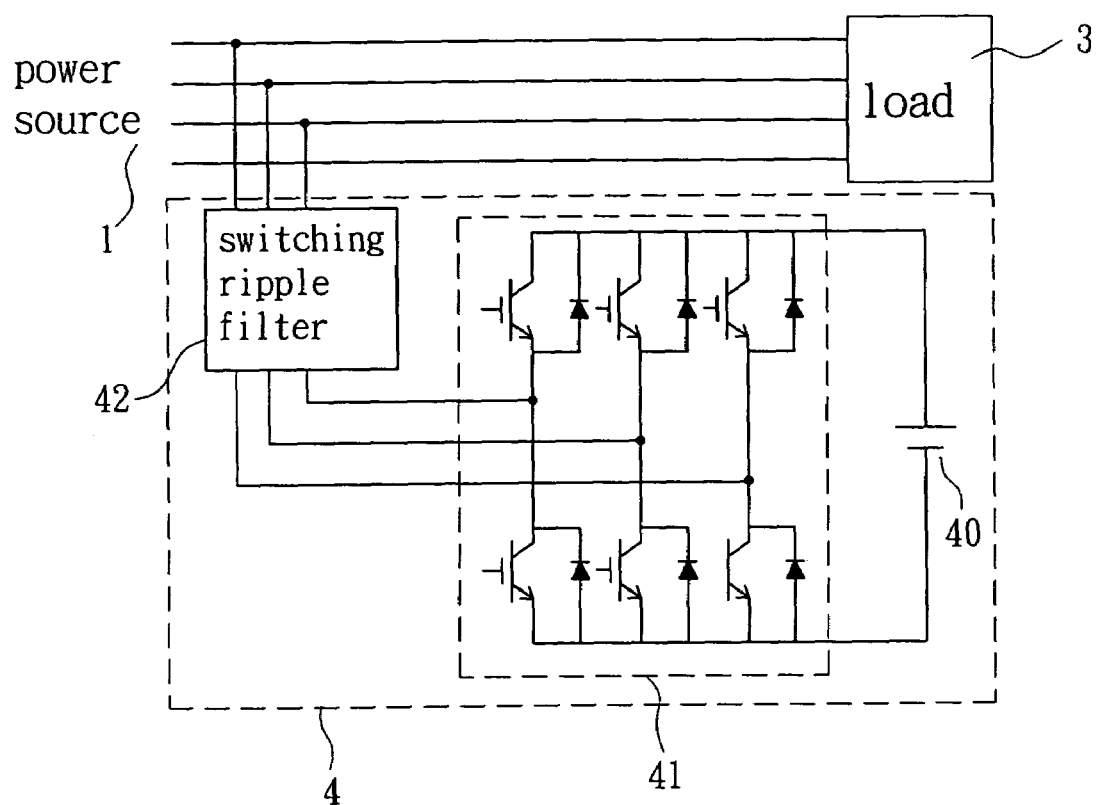
FIG. 1 is a schematic circuitry of a conventional active power filter in accordance with the prior art.

Referring back to FIGS. 1 through 3, the three-phase three-wire active power filter 2 in accordance with the first and second embodiments of the present invention has a relatively simplified structure and low manufacture cost than the conventional active power filter 4.

In the first and second embodiments, a controller of the three-phase three-wire active power filter 2 can be selectively developed by the conventional control means of a voltage-mode control or a current-mode control. The controller of the three-phase three-wire active power filter 2 in accordance with the present invention is exemplified by the voltage-mode control, and given by way of illustration only. It will be understood that the controller developed by the current-mode control shall not be excluded from the scope of the present invention.

Figure 4:
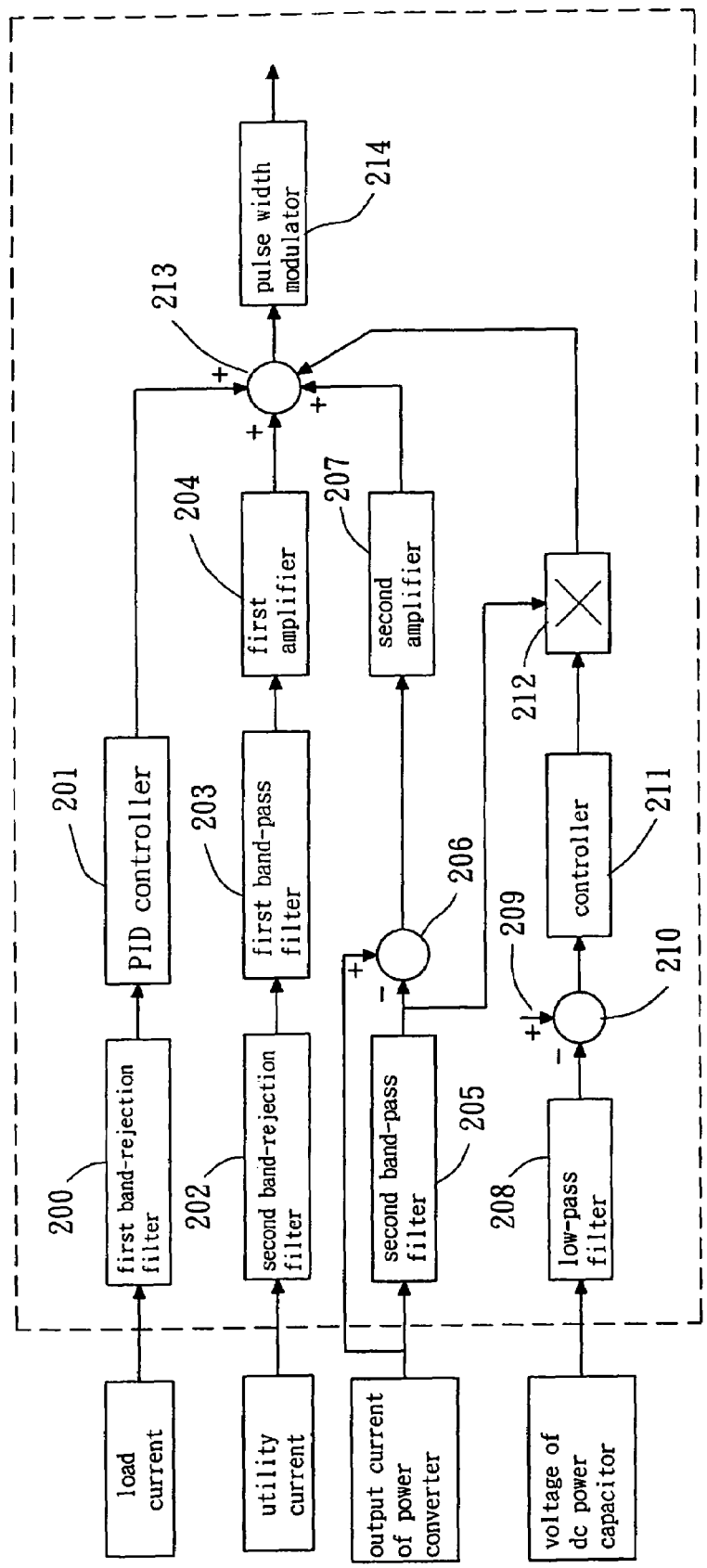
FIG. 4 is a block diagram illustrating a control circuitry of the three-phase three-wire active power filter in accordance with the preferred embodiment of the present invention.

Turning now to FIG. 4, a control circuitry of the three-phase three-wire active power filter in accordance with the preferred embodiment of the present invention is illustrated. The control circuitry of the three-phase three-wire active power filter 2 in accordance with the present invention includes four circuit blocks which are a harmonic compensation circuit block for the load 3, a harmonic suppressing circuit block for the power source 1, a harmonic damping circuit block for the power converter 21 and a voltage-regulating circuit block for the dc power capacitor 20.

In order to outputting harmonic components of the load current, a compensation voltage generated from the power converter 21 must be equal to the product of harmonic components of the load currents and composite impedances of the filter inductor set 22 and the reactive power compensating capacitor set 23. In the harmonic compensation circuit block for the load 3, a load current is detected and a first band-rejection filter 200 is used to filter the fundamental components of the load current for obtaining harmonic components. A voltage of the inductor of the filter inductor set 22 can be given by differentiating a current; a voltage of the ac power capacitor of the reactive power compensating capacitor set 23 can be given by integrating a current; and a voltage of the stray resistor of inductor and ac power capacitor can be given by multiplying a current by a proportional gain. Accordingly, the harmonic components are sent to a proportional integral differential (PID) controller 201 so as to obtain a voltage for the harmonic components of load current across the composite impedance of the filter inductor set 22 and the reactive power compensating capacitor set 23. Consequently, an output signal of the harmonic compensation circuit block for the load 3 can be obtained.

Since the parameters of the filter inductor set 22 and the reactive power compensating capacitor set 23 may be shifted and the harmonic compensation circuit block for the load is in an open-circuit control, it will result in degradation of the filtering effect. The harmonic suppressing circuit block for the power source 1 is mainly used to correct errors of the compensation results of the harmonic compensation circuit block for the load 3, and to further suppress harmonic components of the power source 1. In the harmonic suppressing circuit block for the power source 1, a current of the power source is detected and sent to a second band-rejection filter 202 for filtering fundamental component. The result of the second band-rejection filter 202 is subsequently sent to a first band-pass filter 203 for retrieving dominant harmonic components. The result of the first band-pass filter 203 is sent to a first amplifier 204 for amplifying signals. Consequently, an output signal of the harmonic suppressing circuit block for the power source 1 can be obtained. If the waveforms of the utility currents of power source 1 are still distorted, the harmonic suppressing circuit block for the power source 1 can compensate them.

Next, the harmonic damping circuit block for the power converter 21 is used to produce a virtual harmonic damping resistor for the filter inductor set 22 and the reactive power compensating capacitor set 23 and to avoid high-frequency oscillation in the filter inductor set 22 and the reactive power compensating capacitor set 23. In the harmonic damping circuit block for the power converter 21, an output current of the power converter 21 is sent to a second band-pass filter 205 for extracting its fundamental component. The output of the second band-pass filter 205 is sent to a subtractor 206 to obtain harmonic components. The result of the subtractor 206 is subsequently sent to a second amplifier 207 for amplifying signals. Consequently, an output signal of the harmonic damping circuit block for the power converter 21 can be obtained.

In order to maintain the normal operation of the power converter 21 with a dc voltage supplied from the dc power capacitor 20, the voltage-regulating circuit block for the dc power capacitor 20 of the control circuit of the active power filter 2 is provided. In the voltage-regulating circuit block for the dc power capacitor 20, a dc voltage of the dc power capacitor 20 is detected and sent to a low-pass filter 208. The output of low-pass filter 208 is sent to a subtractor 210 to be subtracted from a predetermined voltage 209. The result of the subtractor 210 is subsequently sent to a controller 211. The output of the controller 211 is sent to a multiplier 212 and multiplied by the output of the second band-pass filter 205. Consequently, an output signal of the voltage-regulating circuit block for the dc power capacitor 20 can be obtained. The voltage-regulating circuit block for the dc power capacitor 20 can control the power converter 21 to absorb or supply a real power from or to the power system 1; consequently, a dc voltage supplied from the dc power capacitor 20 can be regulated.

The output signals of the harmonic compensation circuit block for the load 3, the harmonic suppressing circuit block for the power source 1, the harmonic damping circuit block for the power converter 21 and the voltage-regulating circuit block for the dc power capacitor 20 are sent to an adder 213 which adds the above four signals to obtain a reference signal. Subsequently, the result of the adder 213 is sent to a pulse width modulation circuit 214 to obtain switching signals for driving the power electronic switch set of the power converter.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A three-phase three-wire active power filter, comprising:
   a dc capacitor providing a regulated dc voltage;
   a power converter including a two-arm power electronic switch set, the power electronic switch set having a pair of ac terminals and a pair of dc terminals;
   a filter inductor set connected the power converter, and used to suppress a high frequency ripple current due to the switching behavior of the power converter;
   a reactive power compensating capacitor set connected in series with the filter inductor set for generating a reactive power;
   a combined capacitor/resistor filtering set parallel connected between the serial-connection of the filter inductor set with the reactive power compensating capacitor set and a power line such that the combined capacitor/resistor filtering set being in cooperation with the filter inductor for filtering harmonics generated from the power converter; and
   a control circuit generating switching signals for driving the power electronic switch set of the power converter to generate a compensating current;
   wherein the compensating current being injected into the power line, and thereby three-phase utility currents supplied from a three-phase three-wire power system being approximated as sinusoidal waveforms.

2. The three-phase three-wire active power filter as defined in claim 1, wherein the filter inductor set including three inductors while the reactive power compensating capacitor set including three ac power capacitors.

3. The three-phase three-wire active power filter as defined in claim 2, wherein each of the inductors of the filter inductor set serially connected with each of the ac power capacitors of the reactive power compensating capacitor set to constitute three serial-connected inductor/capacitor sets; wherein any two of the three serial-connected inductor/capacitor sets connecting with two points between two power lines of a three-phase three-wire power system and the two ac terminals of the power converter; wherein the other of the three serial-connected inductor/capacitor sets connecting with the other power line of the three-phase three-wire power system and a negative terminal of the dc terminals of the power converter.

4. The three-phase three-wire active power filter as defined in claim 2, wherein each of the inductors of the filter inductor set serially connected with each of the ac power capacitors of the reactive power compensating capacitor set to constitute three serial-connected inductor/ac power capacitor sets; wherein any two of the three serial-connected inductor/capacitor sets connecting with two points between two power lines of a three-phase three-wire power system and the two ac terminals of the power converter; wherein the other of the three serial-connected inductor/capacitor sets connecting with the other power line of the three-phase three-wire power system and a positive terminal of the dc terminals of the power converter.

5. The three-phase three-wire active power filter as defined in claim 1, wherein the control circuit substantially including a harmonic compensation circuit block for the load, a harmonic suppressing circuit block for the power source, a harmonic damping circuit block for the power converter and a voltage-regulating circuit block for the dc power capacitor.

6. The three-phase three-wire active power filter as defined in claim 1, wherein the control circuit further including an adder for summing the output signals of the harmonic compensation circuit block for the load, the harmonic suppressing circuit block for the power source, the harmonic damping circuit block for the power converter and the voltage-regulating circuit block for the dc power capacitor and a pulse width modulation circuit to obtain switching signals for driving the power electronic switch set of the power converter.

* * * * *